United States Patent [19]

Drake

[11] 4,322,500
[45] Mar. 30, 1982

[54] POTASSIUM FLUOROBORATE SILICATE GLASSES

[75] Inventor: Cyril F. Drake, Essex, England

[73] Assignee: International Standard Electric Corporation, New York, N.Y.

[21] Appl. No.: 154,709

[22] Filed: May 30, 1980

[30] Foreign Application Priority Data

Jun. 12, 1979 [GB] United Kingdom ............... 20465/79

[51] Int. Cl.³ .......................... C03C 3/08; C03C 3/18
[52] U.S. Cl. ..................... 501/77; 350/96.3; 350/96.34; 501/3; 501/32; 501/35; 501/37; 501/25; 501/903
[58] Field of Search ............. 106/47 Q, 47 R, 54, 106/50, 48; 423/279, 293, 464; 501/43, 77, 25, 58, 59

[56] References Cited

U.S. PATENT DOCUMENTS

| | | | |
|---|---|---|---|
| 2,038,691 | 4/1936 | Taylor | 106/47 R |
| 3,671,380 | 6/1972 | Awi et al. | 106/50 X |
| 3,764,354 | 10/1973 | Ritze et al. | 106/54 |
| 3,877,953 | 4/1975 | Broemer et al. | 501/77 |
| 3,877,995 | 4/1975 | Levine et al. | 106/54 X |
| 4,221,825 | 9/1980 | Guerder et al. | 106/50 X |

OTHER PUBLICATIONS

Chem. Abstracts, vol. 80, item 51730x.

*Primary Examiner*—Helen M. McCarthy
*Attorney, Agent, or Firm*—J. B. Raden; H. J. Holt

[57] ABSTRACT

A potassium fluoro-borate glass, including silica and optionally alumina, containing at least 20 mole % potassium computed as $K_2(O,F_2)$, and wherein there are more fluorine atoms in the glass than oxygen atoms. The range of compositions includes low refractive index glasses, some with refractive indices less than that of silica, and high coefficient of thermal expansion glasses, some with coefficients matching those of aluminum, copper and brass.

6 Claims, 1 Drawing Figure

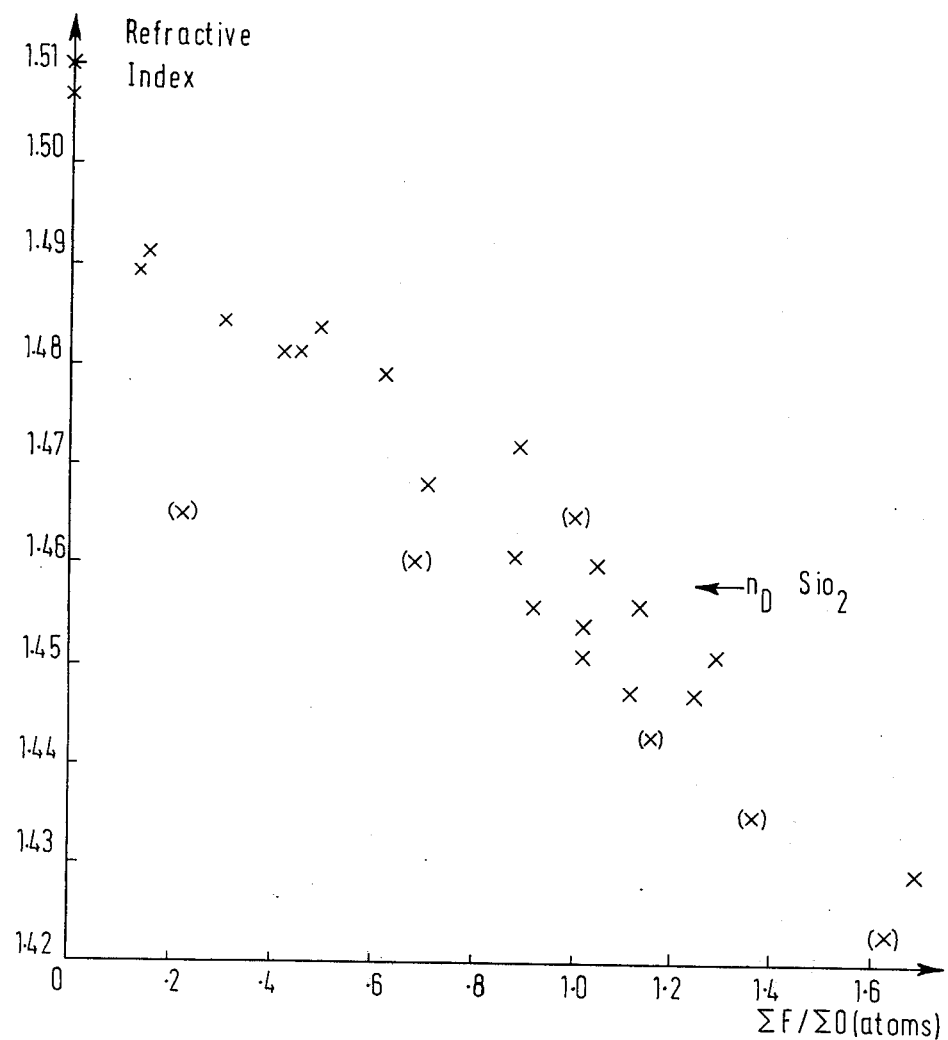

POTASSIUM FLUOROBORATE SILICATE GLASSES

This invention relates to fluorine containing glasses.

Certain sodium silicate and sodium borosilicate glasses in which some of the oxygen is replaced by fluorine are known, and some use has been made of a limited number of compositions in order to obtain particular refractive index/dispersion relationships. In such glasses it is believed that the extent of replacement of oxygen with fluorine atoms has been limited to about 10%.

According to the present invention there is provided a potassium fluoroborate, potassium alumino-fluoroborate, potassium fluoroborate silicate, or potassium alumino-fluoroborate-silicate glass, which glass contains at least 20 mole % potassium computed on the basis of the stoiciometric relationship $K_2(O,F_2)$, contains not more than 5 mole % in aggregate of other glass modifying oxides and fluorides and not more than 5 mole % in aggregate of other glass forming oxides and fluorides, and wherein the proportion of fluorine atoms to oxygen atoms in the glass is at least 5%.

There follows a description of illustrative embodiments of the invention, and of related glass compositions. The description refers to the accompanying drawing which is a graph showing the relationship between refractive index and fluorine content.

One characteristic of these glasses is that they tend to have low refractive indices, and hence in the case of clear homogeneous glasses, can be used in optical elements such as lenses and the like. Another use is in optical waveguide elements. One material commonly used as the high index core material of a step-index waveguide is silica. Since silica is itself a low index glass, the lower index cladding material commonly used in conjunction with a silica cored waveguide is a plastics material. However, for some applications such as for instance in optical fibre connectors it is often desirable to employ a dimensionally more stable cladding material. Such a material may be provided by one of the compositions having a refractive index less than that of silica.

Another characteristic of at least some of these glasses, particularly those that do not readily if at all form clear homogeneous glasses, is that they tend to have relatively large coefficients of thermal expansion that are comparable with those of many metals including aluminum, copper and brass. These compositions hence also find application as expansion coefficient matched glasses for metal-to-glass seals.

The partial replacement of oxygen with fluorine has been found generally to produce a reduction in refractive index approximately in proportion to the magnitude of the replacement. This replacement is at least 5%, is preferably 10% or more, and for glasses having a refractive index, $n_D$, comparable with or lower than that of silica, there are more fluorine atoms present than oxygen atoms.

A low refractive index is also provided by selecting for the main cation constituent those ions with a low effective atomic refraction such as potassium rather than other alkali metals, and aluminum rather than alkaline earths. Preferably the mole percentage of potassium computed as $K_2(O,F_2)$ does not exceed 45 mole %, and that of aluminum computed as $Al_2(O_3,F_6)$ does not exceed 20 mole %.

The molar percentage of boron computed as $B_2(O_3,F_6)$ is typically selected to lie in the range 20 to 60 mole %. Silica may be included in the composition in order to stabilize the glass against devitrification and phase separation, and also against hydrolytic instability effects. For this purpose the molar percentage of silicon computed as $Si(O_2,F_4)$ is typically at least 5 mole % to provide a significant stabilization effect, and not more than 35 mole % so as not to raise the melting point unduly high.

Even within these preferred ranges it is of course necessary, if an optical quality glass is required, to select regions of the composition diagram for which a person skilled in the art would expect neither liquid-liquid nor solid-liquid phase separation to be an insurmountable problem. As with most glass systems, minor additions of other glass modifiers may be included, such as oxides and fluorides of calcium and magnesium, up to an amount not exceeding 5 mole % in aggregate. Similarly minor additions to titanium and germanium may be included up to an amount not exceeding 5 mole % in aggregate.

The use of boric oxide and silica as glass forming oxides tends to set a potentially inconveniently low upper limit to the fluorine/oxygen atomic ratio in the glass when the fluorine atoms are introduced into the system solely by using conventional fluorides such as potassium fluoride and aluminum trifluoride. This limit can however be exceeded by adding part or all of the potassium and fluorine atoms to the system in the form of potassium fluoroborate. Some boron fluoride is lost by volatilization during melting, but under standardized conditions this loss can be compensated by altering the proportions of the constituents of the batch from which the glass is made.

The batch consisting of dry powdered constituents is well mixed and melted, preferably while being stirred. The melting may be carried out in a platinum crucible heated in dry air or other dry inert gas such as nitrogen, argon or oxygen, preferably in electrically heated furnace, at a temperature in the range 600° C. to 1200° C. depending upon composition. It will be clear that the relatively higher silica content glasses will in general require a higher melting temperature than the relatively lower silica content glasses.

Examples of typical compositions are given in the following table in which constituent quantities are expressed in mole %. The majority of these examples lie within the claimed composition range, but for the purpose of comparison related examples are included which lie beyond the borders of this range.

TABLE

| Example | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| $K_2O$ | 37.3 | 33.3 | 46.8 | 44.9 | 38.3 | 32.7 | 27.2 | 22.1 | 21.6 | 17.5 | 21.8 | 25.7 | 23.5 | 31.9 |
|  | (44.5)* | (37.7) | (54.9) | (51.7) | (44.0) | (37.3) | (30.9) | (24.9) | (24.4) | (19.6) | (24.6) | (29.3) | (26.5) | (37.8) |
| $B_2O_3$ | 62.7 | 48.3 | 44.2 | 41.6 | 44.1 | 45.7 | 47.4 | 48.3 | 47.8 | 48.3 | 47.2 | 47.3 | 46.2 | 50.2 |
|  | (55.5) | (40.7) | (38.5) | (35.6) | (37.6) | (38.7) | (40.0) | (40.4) | (40.2) | (40.3) | (39.6) | (40.1) | (38.7) | (44.2) |
| $SiO_2$ | — | 6.4 | 9.0 | 9.7 | 9.5 | 9.5 | 9.4 | 9.6 | 10.9 | 10.8 | 11.0 | 10.9 | 10.8 | 11.8 |
|  |  | (4.6) | (6.8) | (7.2) | (7.0) | (6.9) | (6.8) | (6.9) | (7.9) | (7.8) | (7.9) | (8.0) | (7.8) | (9.0) |

TABLE-continued

| | | | | | | | | | | | | | |
|---|---|---|---|---|---|---|---|---|---|---|---|---|---|
| 2(AlF₃) | — | — | — | — | — | — | — | — | — | — | — | — | — | — |
| 2(KF) | — | 12.1 (16.9) | 0 | 3.9 (5.5) | 8.05 (11.4) | 12.1 (17.0) | 15.9 (22.3) | 20.0 (27.8) | 19.7 (27.5) | 23.4 (32.4) | 20.0 (27.8) | 16.1 (22.6) | 19.5 (27.1) | 6.13 (9.0) |
| 2(KBF₄) | — | — | — | — | — | — | — | — | — | — | — | — | — | — |
| ΣF/ΣO | 0 | 0.13 | 0 | 0.04 | 0.08 | 0.13 | 0.17 | 0.21 | 0.21 | 0.25 | 0.22 | 0.17 | 0.21 | 0.06 |
| K₂(O,F₂) | 37.3 | 45.4 | 46.8 | 48.8 | 46.4 | 44.8 | 43.1 | 42.1 | 41.3 | 40.9 | 41.8 | 41.8 | 43.0 | 38.0 |
| Index | 1.51 | 1.489 | | | | | | | | | | | 1.465 | |
| Appearance | | | Crystalline | | | | | | | | | | Opalescent after anneal | Good glass after anneal |

| Example | 15 | 16 | 17 | 18 | 19 | 20 | 21 | 22 | 23 | 24 | 25 | 26 | 27 | 28 |
|---|---|---|---|---|---|---|---|---|---|---|---|---|---|---|
| K₂O | 26.75 (31.8) | 19.45 (23.3) | 41.2 (43.6) | 35.9 (36.5) | 42.3 (42.0) | 40.2 (48.1) | 29.4 (32.2) | 24.5 (25.8) | 28.8 (32.8) | 29.9 (31.0) | 15.0 (15.0) | 30.0 (29.3) | 26.5 (26.8) | 10.4 (10.1) |
| B₂O₃ | 52.7 (46.6) | 56.8 (50.6) | 39.1 (30.7) | 38.5 (29.1) | 31.9 (23.6) | 50.1 (44.5) | 51.3 (41.8) | 51.3 (40.2) | 47.5 (40.2) | 44.8 (34.5) | 44.4 (33.0) | 45.0 (32.6) | 42.1 (31.6) | 42.3 (30.5) |
| SiO₂ | 12.2 (9.3) | 12.8 (9.8) | 9.5 (6.4) | 10.3 (6.7) | 10.0 (6.4) | 9.7 (7.4) | 9.5 (6.7) | 9.6 (6.5) | 9.3 (6.8) | 10.4 (6.9) | 10.5 (6.7) | 5.2 (3.2) | 10.1 (6.5) | 10.4 (6.5) |
| 2(AlF₃) | — | — | 10.2 (19.3) | 15.3 (27.8) | 15.8 (28.0) | — | 9.85 (19.3) | 14.65 (27.6) | — | 14.9 (27.6) | 15.0 (26.8) | 20.0 (34.8) | 15.8 (28.5) | 15.8 (27.4) |
| 2(KF) | 8.38 (12.3) | 11.01 (16.3) | — | — | — | — | — | — | 14.45 (20.3) | — | 15.1 (18.6) | — | 5.2 (6.5) | 21.4 (25.6) |
| 2(KBF₄) | — | — | — | — | — | — | — | — | — | — | — | — | — | — |
| ΣF/ΣO | 0.08 | 0.10 | 0.34 | 0.53 | 0.60 | 0 | 0.30 | 0.45 | 0.15 | 0.49 | 0.71 | 0.68 | 0.62 | 0.88 |
| K₂(O,F₂) | 35.1 | 30.5 | 41.2 | 35.9 | 42.3 | 40.2 | 29.4 | 24.5 | 43.3 | 29.9 | 30.1 | 30.0 | 31.7 | 31.8 |
| Index | | | | | | 1.507₅ | 1.484₀ | 1.481₀ | 1.491₃ | 1.483₅ | 1.468 | — | 1.479 | 1.461 |
| Appearance | Good glass after anneal | Good glass after anneal | | | | Fluid good glass after anneal | V.visc. good glass after anneal | Visc. good glass after anneal | Fluid good glass after anneal | V.visc. good glass after anneal | V.visc. good glass after anneal | Difficult to melt 1100° C. good glass after anneal | Visc. good glass after anneal | Fluid good glass after anneal |

| Example | 29 | 30 | 31 | 32 | 33 | 34 | 35 | 36 | 37 | 38 | 39 | 40 | 41 | 42 |
|---|---|---|---|---|---|---|---|---|---|---|---|---|---|---|
| K₂O | 28.1 (29.6) | 11.0 (11.1) | 5.45 (5.1) | 10.85 (10.3) | 16.5 (15.7) | 21.7 (20.9) | 0 | 5.3 (5.1) | 5.0 (4.8) | 10.0 (9.7) | 0 | 5.0 (4.7) | 10.0 (9.5) | 0 |
| B₂O₃ | 44.3 (34.7) | 44.6 (33.6) | 35.45 (24.8) | 35.25 (24.9) | 34.5 (24.4) | 34.5 (24.7) | 41.2 (28.9) | 40.8 (28.9) | 40.2 (28.5) | 40.2 (28.9) | 39.0 (26.7) | 39.8 (27.7) | 39.4 (27.7) | 39.4 (28.2) |
| SiO₂ | 10.8 (7.3) | 10.7 (6.9) | 10.8 (6.5) | 10.8 (6.6) | 11.0 (6.7) | 11.0 (6.8) | 10.3 (6.2) | 10.3 (6.3) | 10.0 (6.1) | 10.0 (6.2) | 9.8 (5.8) | 9.7 (5.8) | 10.0 (6.0) | 9.8 (6.0) |
| 2(AlF₃) | 11.2 (21.1) | 11.1 (20.1) | 15.6 (26.2) | 15.6 (26.5) | 16.3 (27.7) | 16.3 (28.1) | 16.1 (27.1) | 16.2 (27.6) | 14.9 (25.4) | 14.8 (25.5) | 18.4 (30.3) | 18.1 (30.3) | 18.2 (30.7) | 10.2 (17.5) |
| 2(KF) | 5.6 (7.3) | 22.6 (28.2) | 32.25 (37.4) | 27.05 (31.7) | 21.8 (25.6) | 16.4 (19.5) | 32.4 (37.7) | 27.3 (32.1) | 29.9 (35.2) | 25.0 (29.8) | 32.8 (37.3) | 27.3 (31.6) | 22.4 (26.1) | 40.55 (48.2) |
| 2(KBF₄) | — | — | — | — | — | — | — | — | — | — | — | — | — | — |
| ΣF/ΣO | 0.42 | 0.68 | 1.19 | 1.07 | 1.00 | 0.89 | 1.12 | 1.02 | 1.02 | 0.92 | 1.29 | 1.13 | 1.04 | 1.03 |
| K₂(O,F₂) | 33.7 | 33.6 | 37.7 | 37.9 | 38.3 | 38.1 | 32.4 | 32.6 | 34.9 | 35.0 | 32.8 | 32.3 | 32.4 | 40.55 |
| Index | 1.481 | 1.460₃ | — | — | 1.465 | 1.472 | 1.447₅ | 1.454 | 1.451 | 1.456 | 1.451 | 1.456 | 1.460 | |
| Appearance | Fluid good glass after anneal | Fluid slight opalescent | Cryst. or phase separated | Cryst. or phase separated | Slight opalescent | Good glass | Good glass | Good glass | Opalescent on anneal. Clear on rapid cool | | | | Viscous | V.fluid opalescent |

| Example | 43 | 44 | 45 | 46 | 47 | 48 | 49 | 50 | 51 | 52 | 53 | 54 | 55 | 56 |
|---|---|---|---|---|---|---|---|---|---|---|---|---|---|---|
| K₂O | 0 | 0 | 0 | 0 | 5.4 (4.5) | 4.8 (4.4) | 4.5 (4.2) | 4.4 (4.3) | 4.6 (4.3) | 4.3 (4.1) | 4.0 (3.9) | 13.3 (12.8) | 5.3 (4.9) | 16.0 (15.1) |
| B₂O₃ | 37.0 (26.0) | 40.6 (28.8) | 40.5 (28.5) | 38.4 (26.6) | 35.6 (21.8) | 31.3 (21.2) | 29.6 (20.4) | 27.3 (19.1) | 16.6 (11.5) | 22.9 (16.2) | 23.0 (16.7) | 20.4 (14.6) | 23.7 (16.3) | 23.2 (16.3) |
| SiO₂ | 10.2 (6.2) | 9.9 (6.0) | 9.6 (5.8) | 9.9 (5.9) | 10.4 (7.9) | 13.5 (5.5) | 17.7 (10.5) | 21.9 (13.2) | 29.6 (17.6) | 27.3 (16.7) | 30.0 (18.7) | 29.9 (18.5) | 21.2 (12.5) | 21.3 (12.9) |
| 2(AlF₃) | 11.9 (20.1) | 12.8 (21.8) | 14.1 (23.8) | 16.1 (26.8) | 19.5 (28.7) | 17.3 (28.1) | 16.5 (27.3) | 15.9 (26.8) | 16.9 (28.1) | 15.6 (26.6) | 14.7 (25.6) | 17.6 (30.4) | 15.9 (26.2) | 16.0 (27.0) |
| 2(KF) | 40.8 (47.7) | 36.8 (43.3) | 35.8 (41.8) | 35.5 (40.8) | 21.1 (21.5) | 18.7 (21.0) | 17.8 (20.4) | 17.2 (20.0) | 18.2 (20.9) | 16.9 (19.9) | 15.9 (19.1) | 6.6 (7.9) | 18.5 (21.1) | 8.0 (9.3) |
| 2(KBF₄) | — | — | — | — | 8.13 (18.0) | 7.2 (17.5) | 6.9 (17.2) | 6.6 (16.7) | 7.1 (17.7) | 6.5 (16.6) | 6.1 (15.9) | 6.1 (15.8) | 7.7 (19.0) | 7.7 (19.5) |
| ΣF/ΣO | 1.16 | 1.06 | 1.11 | 1.24 | 1.69 | 1.58 | 1.47 | 1.40 | 1.71 | 1.40 | 1.27 | 1.21 | 1.63 | 1.36 |
| K₂(O,F₂) | 40.8 | 36.8 | 35.8 | 35.5 | 34.6 | 30.7 | 29.2 | 28.2 | 29.9 | 27.7 | 26.0 | 26.0 | 31.5 | 31.7 |
| Index | | | | 1.447 | 1.429₁ | 1.425 | 1.427 | 1.428 | 1.432 | 1.433 | 1.434 | 1.446 | 1.423 | 1.435 |
| α × 10⁶ | | | | | 21.3 | 20.6 | 20.2 | 21.1 | 20.2 | 18.4 | 19.0 | | 22.1 | 21.4 |
| Appearance | | | | | | | | | | | | | Clear but not homogeneous | |

| Example | 57 | 58 | 59 | 60 | 61 | 62 | 63 | 64 | 65 | 66 | 67 | 68 | 69 |
|---|---|---|---|---|---|---|---|---|---|---|---|---|---|
| K₂O | 24.0 (23.0) | 16.0 (15.1) | 16.0 (15.1) | 16.1 (15.3) | 16.1 (15.0) | 15.9 (14.8) | 16.8 (15.8) | 10.7 (10.6) | 5.4 (5.1) | 0 | 5.1 (5.0) | 5.5 (6.4) | 0 |
| B₂O₃ | 23.1 (16.5) | 22.5 (15.7) | 17.2 (12.1) | 11.6 (8.2) | 16.8 (11.7) | 17.8 (12.3) | 13.3 (9.3) | 32.0 (23.6) | 34.6 (24.4) | 37.3 (28.2) | 30.7 (22.3) | 32.7 (28.4) | 31.3 (23.3) |
| SiO₂ | 21.4 | 21.4 | 26.7 | 32.1 | 26.9 | 26.5 | 28.0 | 21.3 | 21.6 | 21.2 | 20.5 | 21.8 | 20.8 |

TABLE-continued

|  |  |  |  |  |  |  |  |  |  |  |  |  |
|---|---|---|---|---|---|---|---|---|---|---|---|---|
|  | (13.1) | (12.9) | (16.2) | (19.5) | (16.1) | (15.8) | (16.8) | (13.6) | (13.1) | (13.8) | (12.8) | (16.3) | (13.3) |
| $2(AlF_3)$ | 16.0 | 16.0 | 16.0 | 16.1 | 18.8 | 21.2 | 14.0 | 10.7 | 8.7 | 7.4 | 10.4 | 5.5 | 5.2 |
|  | (27.4) | (26.9) | (27.0) | (27.3) | (31.4) | (35.2) | (23.5) | (19.0) | (14.7) | (13.5) | (18.1) | (11.5) | (9.3) |
| 2(KF) | 0 | 8.0 | 8.0 | 8.1 | 10.7 | 13.2 | 5.6 | 6.6 | 18.9 | 18.9 | 17.8 | 10.0 | 30.2 |
|  |  | (9.3) | (9.3) | (9.5) | (12.3) | (15.2) | (6.5) | (8.1) | (22.1) | (23.7) | (21.4) | (14.4) | (37.3) |
| $2(KBF_4)$ | 7.8 | 8.0 | 8.0 | 8.0 | 5.4 | 2.7 | 11.2 | 9.4 | 8.1 | 7.6 | 7.8 | 7.3 | 6.3 |
|  | (20.0) | (20.2) | (20.3) | (20.3) | (13.5) | (6.7) | (28.2) | (25.0) | (20.6) | (20.7) | (20.4) | (22.9) | (16.9) |
| $\Sigma F/\Sigma O$ | 1.16 | 1.40 | 1.46 | 1.53 | 1.48 | 1.43 | 1.64 | 1.02 | 1.02 | 0.93 | 1.15 | 0.89 | 0.86 |
| $K_2(O,F_2)$ | 31.8 | 32.0 | 32.0 | 32.2 | 32.2 | 31.8 | 33.6 | 26.7 | 32.4 | 26.5 | 30.7 | 32.8 | 36.5 |
| Index | 1.443 |  |  |  |  |  |  |  |  |  |  |  |  |
| $\alpha \times 10^6$ | 19.5 | 21.1 | 20.1 | 20.7 | 18.0 | 17.5 | 21.4 | 22.0 | 25.0 | 26.0 | 29.0 | 24.0 | 22.0 |
| Appearance |  | Visc. at 1100° C. | Visc. at 1100° C. | Visc. at 1100° C. | Visc. at 1050° C. | White constituent in glass | Very opalescent glass | Opalescent | Opalescent | Opalescent | White opalescent | White opalescent | White opalescent |

| Example | 70 | 71 | 72 | 73 | 74 | 75 | 76 | 77 | 78 | 79 | 80 | 81 | 82 | 83 |
|---|---|---|---|---|---|---|---|---|---|---|---|---|---|---|
| $K_2O$ | 19.7 | 18.9 | 11.1 | 10.9 | 14.7 | 19.6 | 24.6 | 23.7 | 22.6 | 4.0 | 8.8 | 4.0 | 4.2 | 4.1 |
|  | (20.0) | (18.4) | (11.0) | (11.0) | (14.1) | (18.6) | (22.9) | (22.6) | (22.0) | (4.0) | (8.8) | (4.0) | (4.1) | (4.1) |
| $B_2O_3$ | 29.5 | 28.4 | 33.2 | 32.7 | 19.6 | 19.6 | 19.7 | 24.4 | 22.4 | 30.8 | 30.7 | 28.1 | 34.0 | 30.9 |
|  | (22.3) | (20.5) | (24.5) | (24.4) | (14.0) | (13.8) | (13.6) | (17.3) | (16.2) | (22.7) | (22.9) | (20.9) | (24.9) | (22.8) |
| $SiO_2$ | 19.7 | 18.9 | 22.1 | 21.8 | 26.9 | 24.9 | 19.6 | 18.9 | 22.6 | 25.7 | 25.6 | 29.4 | 22.1 | 25.8 |
|  | (12.8) | (11.8) | (14.1) | (14.0) | (16.5) | (15.1) | (11.7) | (11.5) | (14.1) | (16.3) | (16.4) | (18.9) | (14.0) | (16.4) |
| $2(AlF_3)$ | 9.8 | 14.2 | 16.6 | 10.9 | 17.1 | 19.6 | 19.6 | 18.9 | 18.1 | 14.7 | 14.6 | 14.4 | 15.1 | 14.7 |
|  | (17.8) | (24.7) | (29.5) | (19.6) | (29.3) | (33.1) | (32.5) | (32.1) | (31.5) | (26.0) | (26.2) | (25.8) | (26.6) | (26.1) |
| 2(KF) | 18.1 | 8.8 | 16.2 | 12.9 | 17.5 | 12.1 | 12.9 | 14.1 | 13.5 | 19.1 | 14.0 | 18.8 | 20.8 | 19.4 |
|  | (22.7) | (10.6) | (19.9) | (11.0) | (20.7) | (14.1) | (14.8) | (16.6) | (16.2) | (23.3) | (17.3) | (23.2) | (25.3) | (23.8) |
| $2(KBF_4)$ | 1.6 | 5.4 | 0.4 | 7.4 | 2.1 | 2.1 | 1.8 | 0 | 0 | 2.9 | 3.1 | 2.7 | 1.9 | 2.6 |
|  | (4.4) | (14.1) | (1.1) | (19.9) | (5.4) | (5.3) | (4.5) |  |  | (7.7) | (8.3) | (7.2) | (5.0) | (6.9) |
| $\Sigma F/\Sigma O$ | 0.74 | 1.03 | 0.87 | 0.93 | 1.21 | 1.24 | 1.29 | 1.05 | 1.00 | 1.01 | 0.93 | 0.99 | 0.98 | 1.00 |
| $K_2(O,F_2)$ | 39.4 | 33.1 | 27.7 | 27.2 | 34.3 | 34.3 | 39.3 | 37.8 | 36.1 | 26.0 | 25.9 | 25.5 | 26.9 | 26.1 |
| Index |  |  | 1.44 | 1.44 |  | 1.45 |  | 1.46 |  | 1.43 | 1.43 | 1.43 | 1.43 | 1.43 |
| $\alpha \times 10^6$ | 26.0 | 24.0 | 19.0 | 22.0 |  |  | 20.5 | 19.0 | 18.0 | 22.0 | 19.0 | 20.5 | 22.0 | 20.5 |
| Appearance | Opalescent | Opalescent | Clear, not homogeneous | Nearly clear | Yellow opalescent | Clear glass | Yellow opalescent | Clear glass | Clear glass | Clear glass | Clear glass | Clear glass | Clear glass | Clear glass |

*Values in parentheses are weight % corresponding to mole % immediately above.

BRIEF DESCRIPTION OF DRAWING

The accompanying drawing shows in the form of a graph that there is an approximately linear relationship between the ratio of fluorine atoms to oxygen atoms $\Sigma F/\Sigma O$ and refractive index. Only those compositions for which refractive index is quoted in the table to at least four significant figures are plotted. Those compositions which are designated in the table as being of uncertain homogeneity are represented by plots placed within parentheses. The table also gives a measure of the expansion coefficient $\alpha$ for some of the compositions.

I claim:

1. A fluorine containing glass selected from the group consisting of potassium fluoroborate silicate and potassium alumino-fluoroborate silicate glass, which glass contains at least 20 mole % potassium computed as $K_2(O,F_2)$, at least 5 mole % silicon computed as $Si(O_2,F_4)$, at least 20 mole % boron computed as $B_2(O_3,F_6)$, not more than 5 mole % in aggregate of other glass modifying oxides and fluorides and not more than 5 mole % in aggregate of other glass forming oxides and fluorides, and wherein there are more fluorine atoms than oxygen atoms in the glass.

2. The glass of claim 1 which contains not more than 35 mole % silicon computed as $Si(O_2,F_4)$.

3. The glass of claim 1 in which the glass is an alumino-fluoroborate silicate containing not more than 20 mole % aluminum computed as $Al_2(O_3,F_6)$.

4. The glass of claim 1 including not more than 60 mole % boron computed as $B_2(O_3,F_6)$.

5. The glass of claim 1 containing not more than 45 mole % potassium computed as $K_2(O,F_2)$.

6. The glass of claim 1, the refractive index of which is less than that of silica.

* * * * *